(12) United States Patent
Dölker

(10) Patent No.: US 9,624,860 B2
(45) Date of Patent: Apr. 18, 2017

(54) METHOD FOR THE CONTROL AND REGULATION OF A V-TYPE INTERNAL COMBUSTION ENGINE

(75) Inventor: Armin Dölker, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 554 days.

(21) Appl. No.: 13/505,190

(22) PCT Filed: Oct. 20, 2010

(86) PCT No.: PCT/EP2010/006417
§ 371 (c)(1),
(2), (4) Date: May 11, 2012

(87) PCT Pub. No.: WO2011/050919
PCT Pub. Date: May 5, 2011

(65) Prior Publication Data
US 2012/0210976 A1  Aug. 23, 2012

(30) Foreign Application Priority Data

Oct. 30, 2009 (DE) ........................ 10 2009 051 389

(51) Int. Cl.
| | | |
|---|---|---|
| F02M 63/02 | (2006.01) | |
| F02D 41/06 | (2006.01) | |
| F02D 41/14 | (2006.01) | |
| B60K 6/48 | (2007.10) | |
| F02B 75/22 | (2006.01) | |

(52) U.S. Cl.
CPC ........... F02D 41/062 (2013.01); F02D 41/14 (2013.01); B60K 6/48 (2013.01); F02B 75/22 (2013.01)

(58) Field of Classification Search
CPC ........ B60K 6/48; B60W 10/06; B60W 10/08; B60W 20/00; Y02T 10/48; F02D 41/3809; F02M 55/025; F02M 63/0275; F02M 69/465; F02B 75/22
USPC ......... 123/390, 179.28, 198 DB, 198 F, 399, 123/456, 54.4, 184.31
See application file for complete search history.

(56) References Cited

U.S. PATENT DOCUMENTS

| | | | | |
|---|---|---|---|---|
| 5,433,182 A | * | 7/1995 | Augustin et al. | ............. 123/456 |
| 5,954,032 A | | 9/1999 | Augustin et al. | |
| 6,279,532 B1 | | 8/2001 | Takano et al. | |
| 6,505,608 B2 | | 1/2003 | Hiraku et al. | |
| 6,543,561 B1 | * | 4/2003 | Pels et al. | ................... 180/65.23 |

(Continued)

FOREIGN PATENT DOCUMENTS

| | | |
|---|---|---|
| DE | 19651671 A1 | 6/1998 |
| DE | 19941539 C1 | 3/2001 |
| DE | 10222769 A1 | 11/2003 |
| DE | 10327845 A1 | 2/2004 |
| DE | 10245268 A1 | 4/2004 |

(Continued)

*Primary Examiner* — Hai Huynh
*Assistant Examiner* — Gonzalo Laguarda
(74) *Attorney, Agent, or Firm* — Lucas & Mercanti, LLP; Klaus P. Stoffel

(57) ABSTRACT

Disclosed is a method for the control and regulation of a V-type internal combustion engine (1), comprising an independent common rail system on the A side and an independent common rail system on the B-side, in which the rotational speed of the internal combustion engine (1) is regulated in a speed control loop and a nominal torque as an adjusted variable of the rotational speed governor is limited during the starting procedure to a starting torque for representing a nominal injection null set.

9 Claims, 6 Drawing Sheets

(56) References Cited

U.S. PATENT DOCUMENTS

| | | |
|---|---|---|
| 6,571,772 B1 | 6/2003 | Ott et al. |
| 6,845,747 B2 | 1/2005 | Rasmussen et al. |
| 6,918,367 B2 | 7/2005 | Denz et al. |
| 7,017,549 B2 * | 3/2006 | Doelker .................. 123/399 |
| 7,451,038 B2 | 11/2008 | Kosiedowski et al. |
| 7,610,901 B2 | 11/2009 | Bucher et al. |
| 8,131,454 B2 * | 3/2012 | Steuernagel et al. ......... 701/113 |
| 8,140,243 B2 | 3/2012 | Doelker et al. |
| 2004/0168673 A1 * | 9/2004 | Shinogle ................ 123/456 |
| 2004/0182367 A1 | 9/2004 | Denz et al. |
| 2008/0103674 A1 | 5/2008 | Kosiedowski et al. |
| 2009/0063029 A1 | 3/2009 | Steuernagel et al. |
| 2010/0108035 A1 * | 5/2010 | Dusa ............... F02D 41/06 123/453 |
| 2014/0305406 A1 * | 10/2014 | Pursifull ............. 123/434 |

FOREIGN PATENT DOCUMENTS

| | | |
|---|---|---|
| DE | 10301236 A1 | 7/2004 |
| DE | 10330466 | 10/2004 |
| DE | 1020060492666 | 3/2006 |
| DE | 60112681 T2 | 6/2006 |
| DE | 102006040441 A | 2/2008 |
| DE | 102007000742 A | 4/2008 |
| DE | 102007034317 A | 1/2009 |
| DE | 102007034317 A1 | 1/2009 |
| DE | 102007034317 Y | 1/2009 |
| DE | 4335171 C1 | 3/2009 |
| DE | 102008036300 | 1/2010 |
| EP | 0892168 | 1/1999 |
| EP | 2030857 Y | 3/2009 |
| JP | 200875452 A | 10/2009 |
| WO | 2009013059 | 1/2009 |

* cited by examiner

METHOD FOR THE CONTROL AND REGULATION OF A V-TYPE INTERNAL COMBUSTION ENGINE

The present application is a 371 of International application PCT/EP2010/006417, filed Oct. 20, 2010, which claims priority of 10 2009 051 389.2, filed Oct. 30, 2009, the priority of these applications is hereby claimed and these applications are incorporated herein by reference.

BACKGROUND OF THE INVENTION

The invention concerns a method for the open-loop and closed-loop control of a V-type internal combustion engine with an independent A-side common rail system and an independent B-side common rail system, in which the speed of the internal combustion engine is automatically controlled in a closed-loop speed control system.

In an internal combustion engine with a common rail system, the quality of combustion is critically determined by the pressure level in the rail. Therefore, in order to stay within legally prescribed emission limits, the rail pressure is automatically controlled. A closed-loop rail pressure control system typically comprises a comparison point for determining a control deviation, a pressure controller for computing a control signal, the controlled system, and a software filter in the feedback path for computing the actual rail pressure from the raw values of the rail pressure. The control deviation is computed as the difference between the set rail pressure and the actual rail pressure. The controlled system comprises the pressure regulator, the rail, and the injectors for injecting the fuel into the combustion chambers of the internal combustion engine. For example, DE 103 30 466 B3 describes a common rail system of this type, in which the pressure controller acts by means of a control signal on a suction throttle arranged on the low-pressure side. The suction throttle in turn sets the admission cross section to the high-pressure pump and thus the volume of fuel delivered.

DE 10 2007 034 317 A1 describes an internal combustion engine with an A-side and a B-side common rail system, which are identical in structure. The two common rail systems are hydraulically decoupled from each other and therefore allow independent closed-loop control of the A-side and B-side rail pressure. Pressure fluctuations in the rails are reduced by the separate closed-loop control. Correct closed-loop rail pressure control requires properly operating rail pressure sensors. The failure of one rail pressure sensor or both rail pressure sensors in a given system results in an undefined state of closed-loop pressure control and can produce a critical state of the internal combustion engine, since the cited document fails to indicate any fault safeguards.

The unprepublished German patent application with the official file number DE 10 2008 036 300.6 also describes an internal combustion engine with an independent A-side common rail system and an independent B-side common rail system and closed-loop speed control. In the closed-loop speed control system described there, a speed controller uses the speed control deviation to determine a set torque, which is limited to a maximum value. The maximum value is computed as a function of the actual speed, the charge air pressure, and an air mass ratio. A set injection quantity is then computed by an efficiency input-output map as a function of the limited set torque. An injector input-output map then uses the set injection quantity and a rail pressure to compute the injection time for the actuation of an injector. If an A-side injector is to be actuated, the A-side actual rail pressure is used as the input variable of the injector input-output map. If a B-side injector is to be actuated, the B-side actual rail pressure is used as the input variable of the injector input-output map. Switching from the A side actual rail pressure to the B-side actual rail pressure is carried out as a function of the firing order. Therefore, the failure of a rail pressure sensor causes an undefined state.

During the start-up process, a large speed control deviation is present, since, for example, the idle speed value of 600 rpm is preset as the set speed, while the actual speed corresponds to the starter speed of 120 rpm. Due to the large speed control deviation, the speed controller computes a very high set torque, so that an injection is electrically initiated. The physical opening pressure of the injection nozzles is in the range of 300 to 350 bars. This means that the injection nozzles do not open until the rail pressure reaches or exceeds this pressure threshold. If the rail pressure is less than the nozzle opening pressure, the injection nozzles stay closed, even if the injectors are energized. However, a suitable control quantity of fuel is taken by the injector from the supply line from the rail by the electric actuation of the injectors. The removed control quantity causes a delayed pressure buildup in the rail and causes a delayed start-up process.

SUMMARY OF THE INVENTION

Therefore, the objective of the invention is to make the start-up process faster and more reliable in an internal combustion engine with an independent A-side common rail system and an independent B-side common rail system.

This objective is achieved by a method for the open-loop and closed-loop control of a generic internal combustion engine, in which the speed of the internal combustion engine is automatically controlled in a closed-loop speed control system, and in which a set torque, as the correcting variable of the speed controller, is limited during the start-up process to a starting torque to produce a zero set injection quantity. A positive set injection quantity is not enabled until a verified engine speed is present, both an A-side rail pressure sensor and a B-side rail pressure sensor are operating correctly, and both the A-side actual rail pressure and the B-side actual rail pressure exceed a starting rail pressure. The positive set injection quantity is enabled by limiting the set torque to an operating torque as the maximum torque, which is computed at least as a function of the actual speed.

The central idea of the invention is to limit the set torque as the output variable of the speed controller during engine start-up until a predeterminable starting rail pressure of, for example, 300 bars is reached. The set torque is limited is such a way that a zero set injection quantity is obtained. The term zero set injection quantity is understood to mean a set injection quantity of 0 mg/stroke. In other words, injection remains blocked as long as the rail pressure is less than the starting rail pressure. Since, during the start-up process, fuel is no longer being taken as an activating quantity for the injectors, pressure buildup in the two rails proceeds at the maximum possible pressure gradient. The shortened start-up process is thus an advantage, for example, in an internal combustion engine/generator application (emergency power generating unit).

If a defective A-side rail pressure sensor and an intact B-side rail pressure sensor are detected during the start-up process, injection is enabled if a verified engine speed is present and the B-side actual rail pressure exceeds the starting rail pressure. Therefore, the pressure buildup in the B-side rail still occurs with maximum dynamics. The injection in the A-side rail is enabled with the synchronization of the engine speed, so that although the pressure buildup of this rail is delayed, a reliable engine start is nevertheless made possible. If the B-side rail pressure sensor is defective, an analogous procedure is followed, i.e., the injection remains blocked until the A-side actual rail pressure exceeds the starting rail pressure.

If both rail pressure sensors fail, the injection of all injectors occurs as soon as the internal combustion engine is synchronized, i.e., when a verified engine speed is present. Although the rail pressure builds up with some delay, reliable starting of the internal combustion engine is still possible despite the double failure.

The figures illustrate a preferred embodiment of the invention.

DETAILED DESCRIPTION OF THE INVENTION

Figure 1:
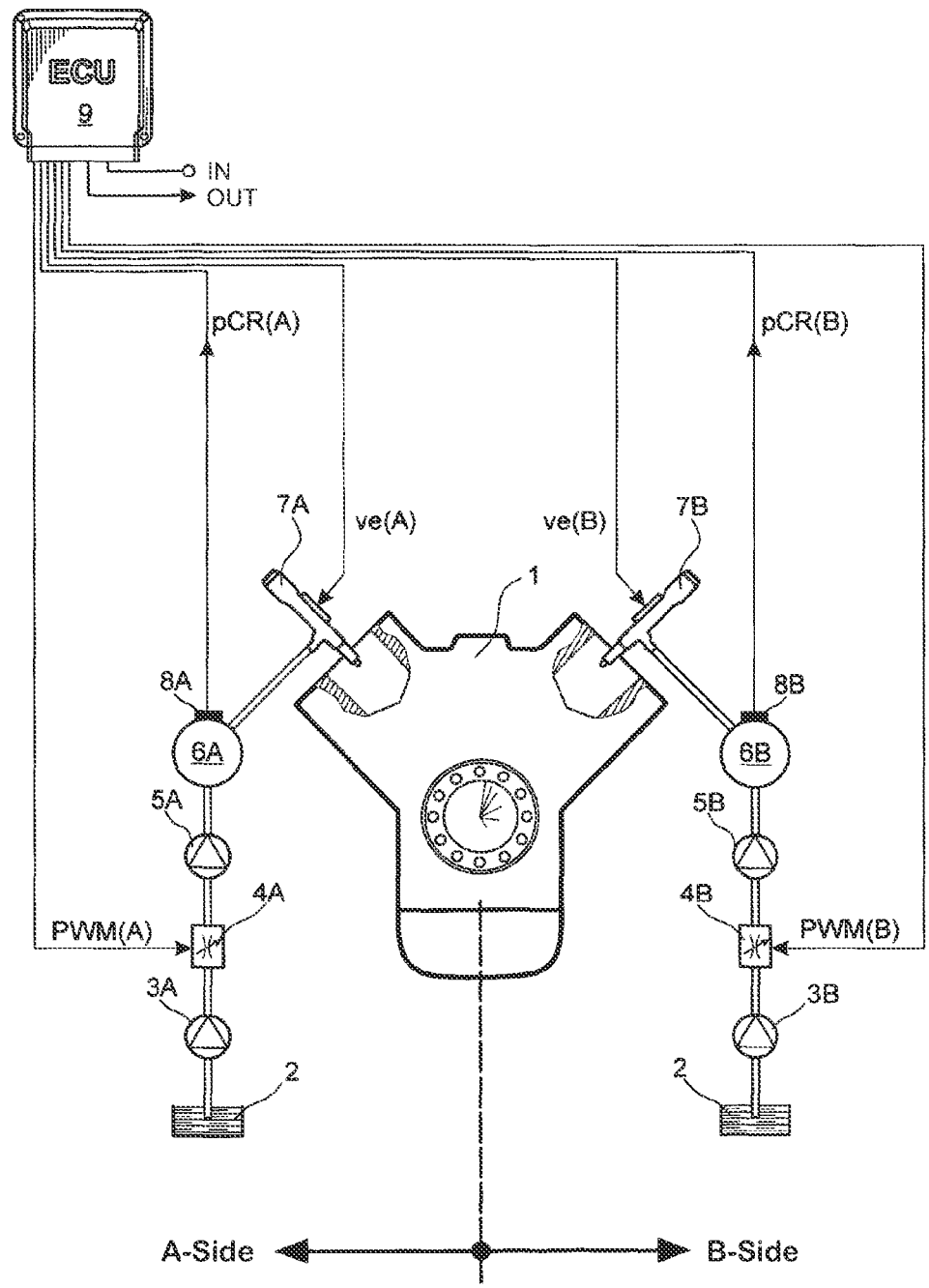
FIG. 1 is a system diagram.

FIG. 1 shows a system diagram of an electronically controlled internal combustion engine 1 with an independent common rail system on the A side and an independent common rail system on the B side. The two common rail systems are identical in structure but are hydraulically separated from each other. The common rail system on the A side comprises the following mechanical components: a low-pressure pump 3A for pumping fuel from a fuel tank 2, a suction throttle 4A for controlling the volume flow, a high-pressure pump 5A, a rail 6A, and injectors 7A for injecting fuel into the combustion chambers of the internal combustion engine 1. Optionally, the common rail system can also be realized with individual accumulators, in which case an individual accumulator is then integrated, for example, in the injector 7A as additional buffer volume. The common rail system on the B side comprises the same mechanical components, which are identified by reference numbers with the suffix B.

The internal combustion engine 1 is controlled by an electronic engine control unit (ECU) 9, which contains the usual components of a microcomputer system, for example, a microprocessor, interface adapters, buffers; and memory components (EEPROM, RAM). Operating characteristics that are relevant to the operation of the internal combustion engine 1 are applied in the memory components in the form of input-output maps/characteristic curves. The electronic control unit 9 uses these to compute the output variables from the input variables. FIG. 1 shows the following input variables of the electronic engine control unit 9 as examples: an A-side rail pressure pCR(A), a B-side rail pressure pCR(B), and an input variable IN. The A-side rail pressure pCR(A) is detected by an A-side rail pressure sensor 8A, and the B-side rail pressure pCR(B) is detected by a B-side rail pressure sensor 8B. The input variable IN is representative of the other input signals, for example, an engine speed or an engine power output desired by the operator. The illustrated output variables of the electronic control unit 9 are a PWM signal PWM(A) for controlling the A-side suction throttle 4A, a power-determining signal ve(A) for controlling the A-side injectors 7A, a PWM signal PWM(B) for controlling the B-side suction throttle 4B, a power-determining signal ve(B) for controlling the B-side injectors 7B, and an output variable OUT. The latter represents additional control signals for automatically controlling the internal combustion engine 1, for example, a control signal for controlling an EGR valve. The characterizing feature of the illustrated embodiment of the invention is the mutually independent closed-loop control of the A-side rail pressure pCR(A) and the B-side rail pressure pCR(B).

Figure 2:
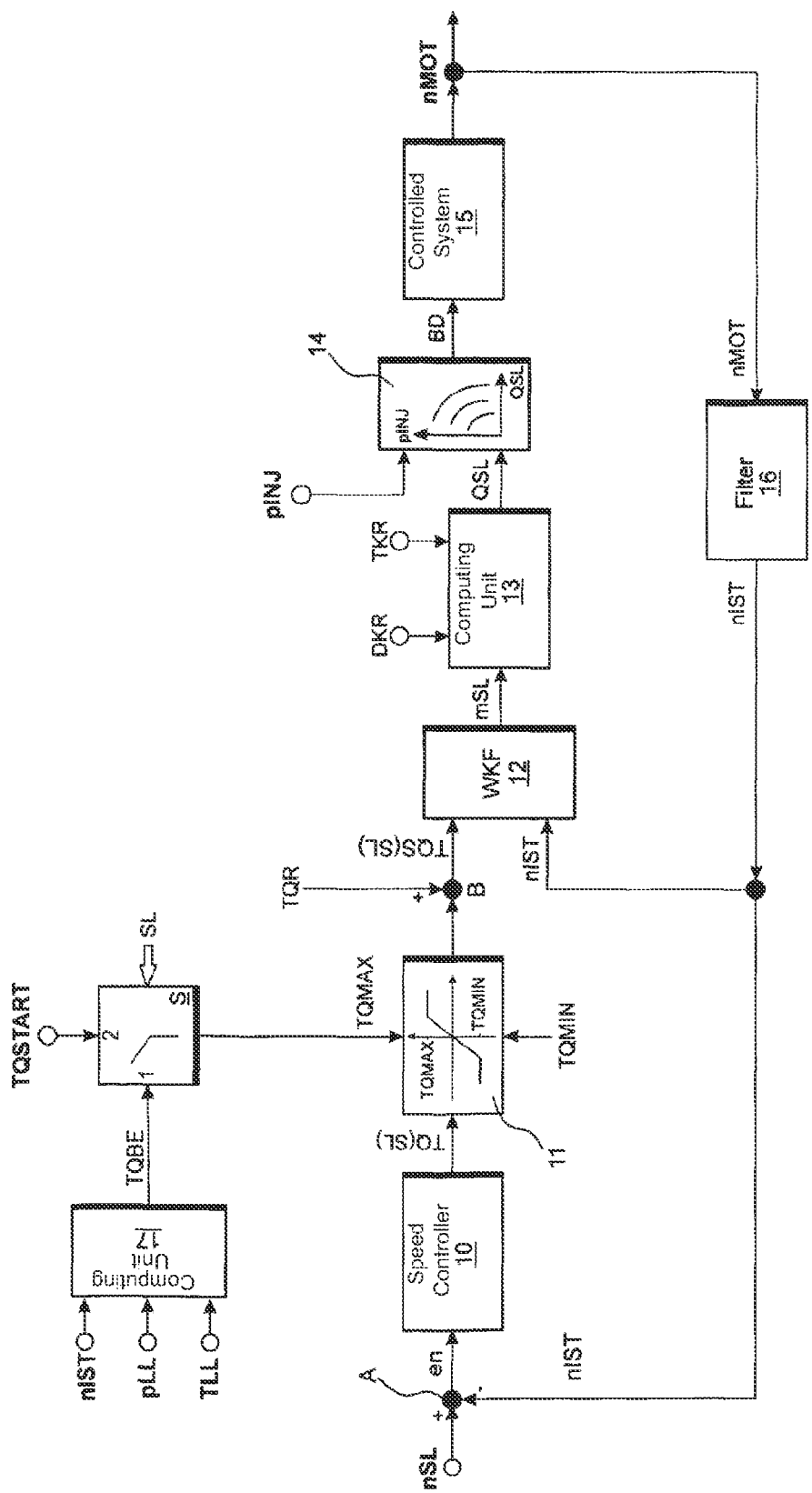
FIG. 2 is a block diagram of the closed-loop speed control system.
Figure 4:
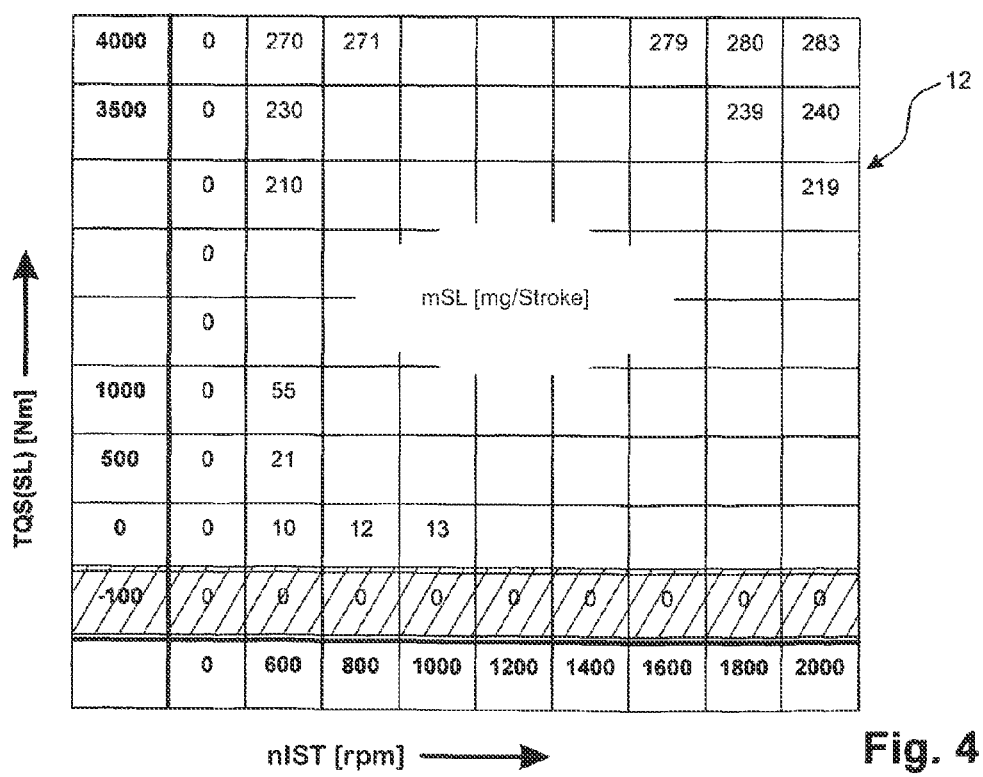
FIG. 4 is the efficiency input-output map.
Figure 5A:
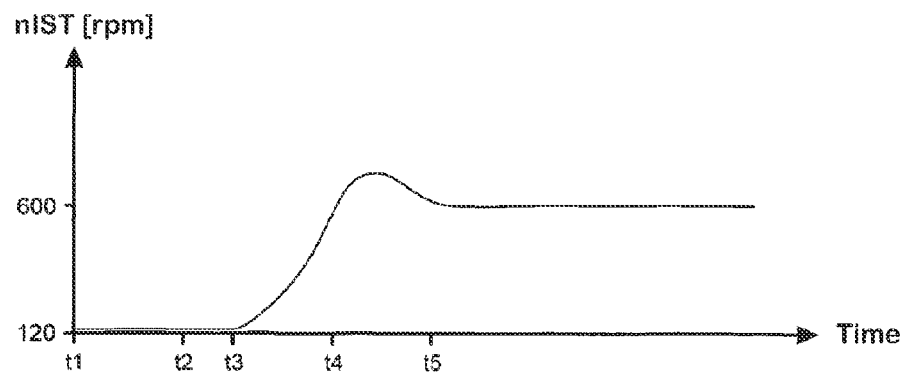
FIG. 5 is a time chart.
Figure 5B:
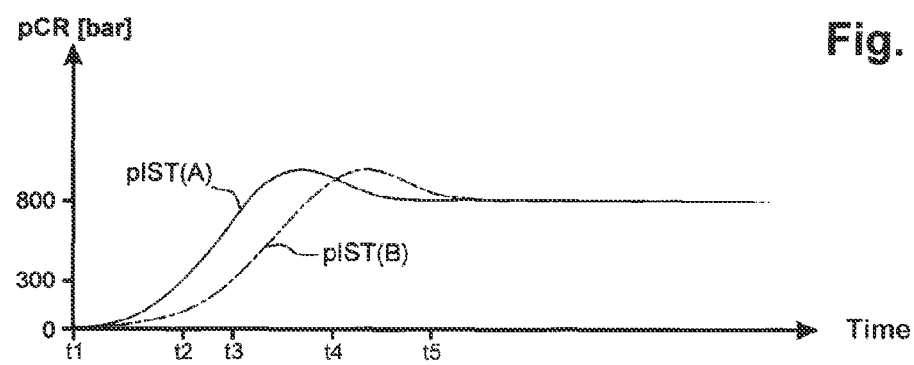
Figure 5C:
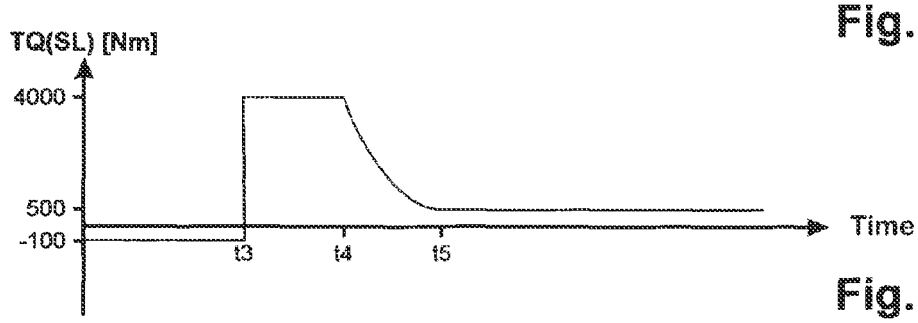
Figure 5D:
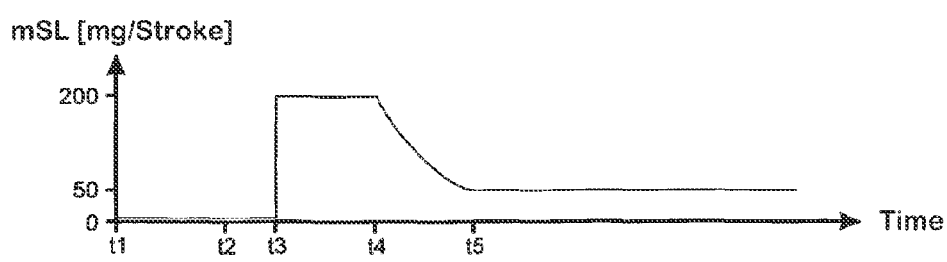

FIG. 2 shows the closed-loop speed control system as a block diagram. The input variables are the set speed nSL, a maximum torque TQMAX, a friction torque TQR, a fuel density DKR, a fuel temperature TKR, aid a pressure pINJ. The output variable constitutes the raw values of the engine speed nMOT. A filter 16 uses the raw values of the engine speed nMOT to compute the actual speed nIST. The actual speed nIST is compared with the set speed nSL at a point A, from which a speed control deviation en is obtained. A speed controller 10 uses the control deviation en to determine a set torque TQ(SL) as a correcting variable. A limiter 11 limits the set torque TQ(SL) to a minimum torque TQMIN and to the maximum torque TQMAX. The limited torque and the friction torque TQR are added at a point B. The friction torque TQR is computed by a friction torque input-output map (not shown) as a function of the engine speed and a virtual temperature. The friction torque TQR represents the deviation of the engine friction torque from the friction torque determined under standard conditions in a test stand run. The sum of the two torques corresponds to a set total torque TQS(SL), which is an input variable of an efficiency input-output map 12. The second input variable of the efficiency input-output map 12 is the actual speed nIST. The efficiency input-output map 12 computes a set fuel mass mSL. The efficiency input-output map 12 is shown in FIG. 4 and will be explained in greater detail in the discussion of that figure. A computing unit 13 computes the set injection quantity QSL from the set fuel mass mSL as a function of the fuel density DKR and the fuel temperature TKR. The set injection quantity QSL is one of the input variables of the injector input-output map 14. The other input variable is the pressure pINJ. In normal operating mode, the pressure pINJ corresponds either to the A-side actual rail pressure or the B-side actual rail pressure. Switching occurs as a function of the firing order in such a way that the actual rail pressure which is used for computing the energization time BD is the one which corresponds to the injector that is currently to be actuated. If, however, e.g., the A-side rail pressure sensor is defective, then a constant rail pressure mean value is set for the injector input-output map 14 instead of the A-side actual rail pressure. Similarly, in the case of a defective B-side rail pressure sensor, the rail pressure mean value, for example, 800 bars, is set for the injector input-output map 14 instead of the B-side actual rail pressure. The energization time BD is then used to activate either an A-side or a B-side injector within the controlled system 15. The output variable of the controlled system 15 represents the raw values of the engine speed nMOT. The closed-loop control system is thus closed.

The closed-loop speed control system is completed by a computing unit 17 and a switch S. The input variables of the computing unit are the actual speed nIST, the charge air pressure pLL, and the charge air temperature TLL, which are used by the computing unit 17 to compute an operating torque TQBE, which is supplied as an input variable to the switch S. Another input variable of the switch is a starting torque TQSTART. The switching of the switch S is effected by a signal SL. During idling and in normal operating mode, the switch S has the position S=1. Therefore, the maximum torque TQMAX corresponds to the computed operating torque TQBE. The switch has the position S=2 as long as one of the two actual rail pressures is still less than the starting rail pressure. In this case, the maximum torque TQMAX corresponds to the starting torque TQSTART. In this connection, the starting torque TQSTART is selected in such a way that a set fuel mass mSL=0 mg/stroke is computed by the efficiency input-output map 12. Consequently, a set injection quantity of QSL=0 mg/stroke, the so-called zero set injection quantity, is also obtained. In other words, injection is blocked by the value of the starting torque TQSTART. Therefore, the following relation applies:

$$TQSTART \leq (\text{first torque data point on efficiency input-output map}) - TQR,$$

where TQR is the friction torque. An injection is not enabled until the signal SL switches the switch S to the position S=1.

Figure 3:
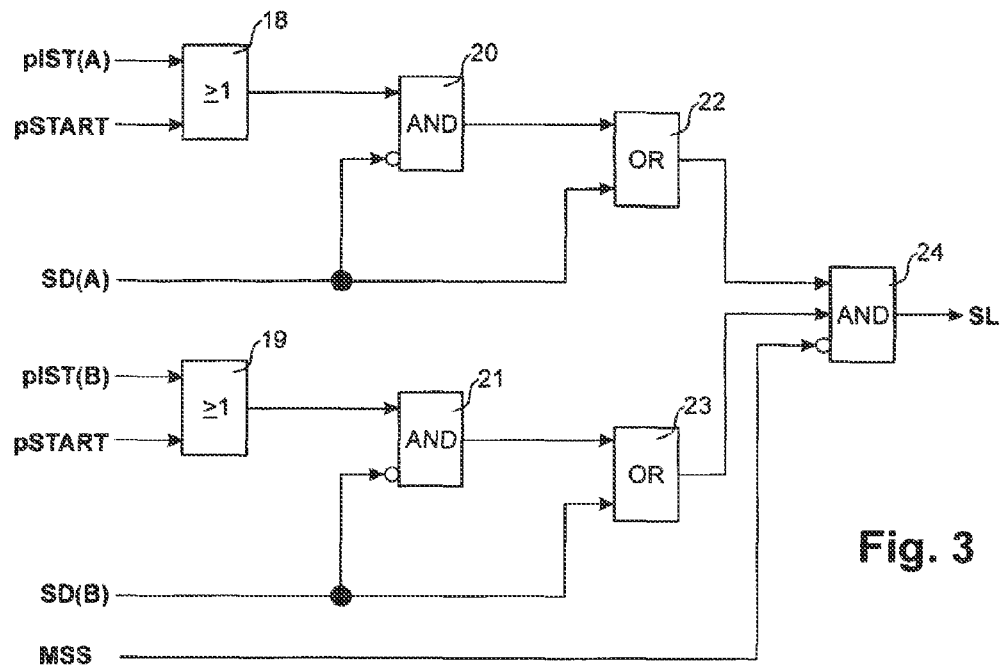
FIG. 3 is a block diagram.

FIG. 3 shows a block diagram for determining the signal SL, by which the position of the switch S in FIG. 2 is defined. The input variables are the A-side actual rail pressure pIST(A), the starting rail pressure pSTART, a signal SD(A), which is set in the event of a defective A-side rail pressure sensor (SD(A)=1), the B-side actual rail pressure pIST(B), a signal SD(B), which is set in the event of a defective B-side rail pressure sensor (SD(B)=1), and a signal MSS. The following applies to the signal MSS: The signal assumes the value MSS=1 if the engine speed falls below a speed threshold, for example, 80 rpm, during a predeterminable time period of, for example, 2.5 s. The signal assumes the value MSS=0 if the speed threshold is exceeded after engine start-up, i.e., when a verified engine speed is present. The output variable of the block diagram is the signal SL. After initialization of the electronic engine control unit, the signal has the value SL=0, which causes the switch S in FIG. 2 to move into position 2, so that the set torque TQ(SL) is limited to the starting torque TQSTART. Accordingly, injection is blocked.

During the engine control unit initialization process, the two rail pressure sensors are checked for freedom from defects. If they are both operating correctly, the signals SD(A) and SD(B) are set to SD(A)=0 and SD(B)=0. As soon as a verified engine speed is present, the signal MSS=0 is set. If the A-side actual rail pressure pIST(A) now rises above the starting rail pressure pSTART, a logical 1 is set at the output of the comparator 18. Since the signal SD(A) is negated, a logical 1 is supplied at both inputs of the AND gate 20. Therefore, the AND condition is satisfied, i.e., a 1 appears at the output of the AND gate. When 1 is set at the output of the AND gate 20, the output of the OR gate 22 switches accordingly from 0 to 1. This logical 1 is likewise supplied to the first input of the AND gate 24. A 1 appears at the second input of the AND gate 24 when the B-side actual rail pressure pIST(B) likewise exceeds the starting rail pressure pSTART. The negated signal MSS is present at the third input of the AND gate 24, i.e., as soon as a verified engine speed is present, a 1 is supply the third input of the AND gate 24. If all of the inputs of the AND gate are equal to 1, then the output of the AND gate 24 is set to the value 1, i.e., SL=1. Therefore, the switch S in FIG. 2 switches from position 2 to position 1. Injection is thus enabled.

If the A-side rail pressure sensor is defective, the output value of the comparator 18 remains 0. A 0 is supplied to both inputs of the AND gate 20, so that a 0 continues to be set at the output of the AND gate 20. Since a logical 1 is supplied to the OR gate 22, namely, SD(A)=1, a 1 also appears at the output of the OR gate 22. Therefore, a 1 is supplied at the first input of the AND gate 24. If the B-side rail pressure sensor pIST(B) rises above the starting rail pressure pSTART, then a 1 is also present at the second input of the AND gate 24 if the B-side rail pressure sensor is not defective. If a verified engine speed is present, all of the inputs of the AND gate 24 are equal to 1, so that the output of the AND gate 24 is set to 1. Injection is thus enabled. In the opposite case, i.e., the A-side rail pressure sensor is operating correctly, but the B-side rail pressure sensor is defective, a corresponding sequence occurs.

If both rail pressure sensors are defective, then signal SD(A)=1, and signal SD(B)=1, so that a 1 is present at the output of the OR gate 22 and at the output of the OR gate 23. The output of the AND gate 24 is thus set to 1 if a verified engine speed is present. Therefore, the switching of the SWITCH S by the signal SL occurs only as a function of the engine speed.

FIG. 4 shows the efficiency input-output map 12. The actual speed nIST in revolutions per minute is plotted on the x-axis, and the set total torque TQS(SL) in newton-meters, which is computed from the limited set torque TQ(SL) and the friction torque TQR. The values within the efficiency input-output map represent the set fuel mass mSL in the unit mg/stroke. For example, at an actual speed of nIST=1800 rpm and a set total torque of TQS(SL)=3500 Nm, a set fuel mass of mSL=239 mg/stroke is computed. The first torque data point, in this case, TQS1(SL)=−100 Nm, is realized in such a way that a set fuel mass of mSL=0 mg/stroke is computed over the entire range of the actual engine speed nIST. This range is shown shaded in FIG. 4 for clarity. In other words, at a set total torque of TQS(SL)≤−100 Nm, injection is blocked.

FIG. 5 shows a time chart of a starting process. FIG. 5 comprises four separate graphs 5A to 15D, which show the following as a function of time: the actual speed nIST in FIG. 5A, the rail pressure pCR in FIG. 5B, the set torque TQ(SL) in FIG. 5C, and the set fuel mass mSL in FIG. 5D. In FIG. 5B, the A-side actual rail pressure pIST(A) is shown as a solid curve, while the B-side actual rail pressure pIST(B) is shown as a dot-dash line. In the illustrated time chart, it was assumed that both rail pressure sensors are operating correctly, the efficiency input-output map of FIG. 4 is used, and the friction torque is TQR=0 Nm, since the starting process is taking place under standard conditions. The set total torque on the y-axis of the efficiency input-output map thus corresponds to the set torque TQ(SL), which is limited by the limiter.

At time t1, the internal combustion engine is started. The rotation of the starter causes both the A-side actual rail pressure pIST(A) and the B-side actual rail pressure pIST(B) to start to rise. Since the A-side actual rail pressure pIST(A) and the B-side actual rail pressure pIST(B) are less than the starting rail pressure pSTART=300 bars, the signal SL=0 and the switch S in FIG. 2 is in position 2. The set torque TQ(SL) is thus initially limited to the value −100 Nm, and the set fuel mass takes the value mSL=0 mg/stroke. At time t2, the A-side actual rail pressure pIST(A) reaches the starting rail pressure pSTART=300 bars. This causes no change, since the B-side actual rail pressure pIST(B) at this time is still less than the starting rail pressure pSTART. At time t3, the B-side actual rail pressure pIST(B) also reaches the starting rail pressure pSTART. As a result, the signal SL is set to SL=1, the switch S (FIG. 2) is switched to position 1, and injection is now enabled. This means that the set torque TQ(SL) is now limited to the operating torque TQBE. For safety reasons, the operating torque is set, for example, to the value TQBE=4000 Nm as long as the actual speed nIST is less than the set speed, here: 600 rpm. Accordingly, the set fuel mass jumps to the value mSL=200 mg/stroke. The actual speed nIST now rises, starting from the starter speed nIST=120 rpm, and at time t4 reaches idling speed nIST=600 rpm. The operating torque TQBE is now computed as a function of the actual speed pIST, the charge air pressure pLL, and the charge air temperature TLL. Since the actual speed nIST overshoots after time t4, the speed controller will reduce the set torque TQ(SL) as the correcting variable. Accordingly, the set fuel mass mSL is also reduced. At time t5, the actual speed nIST has leveled off to the idling speed.

Figure 6A:
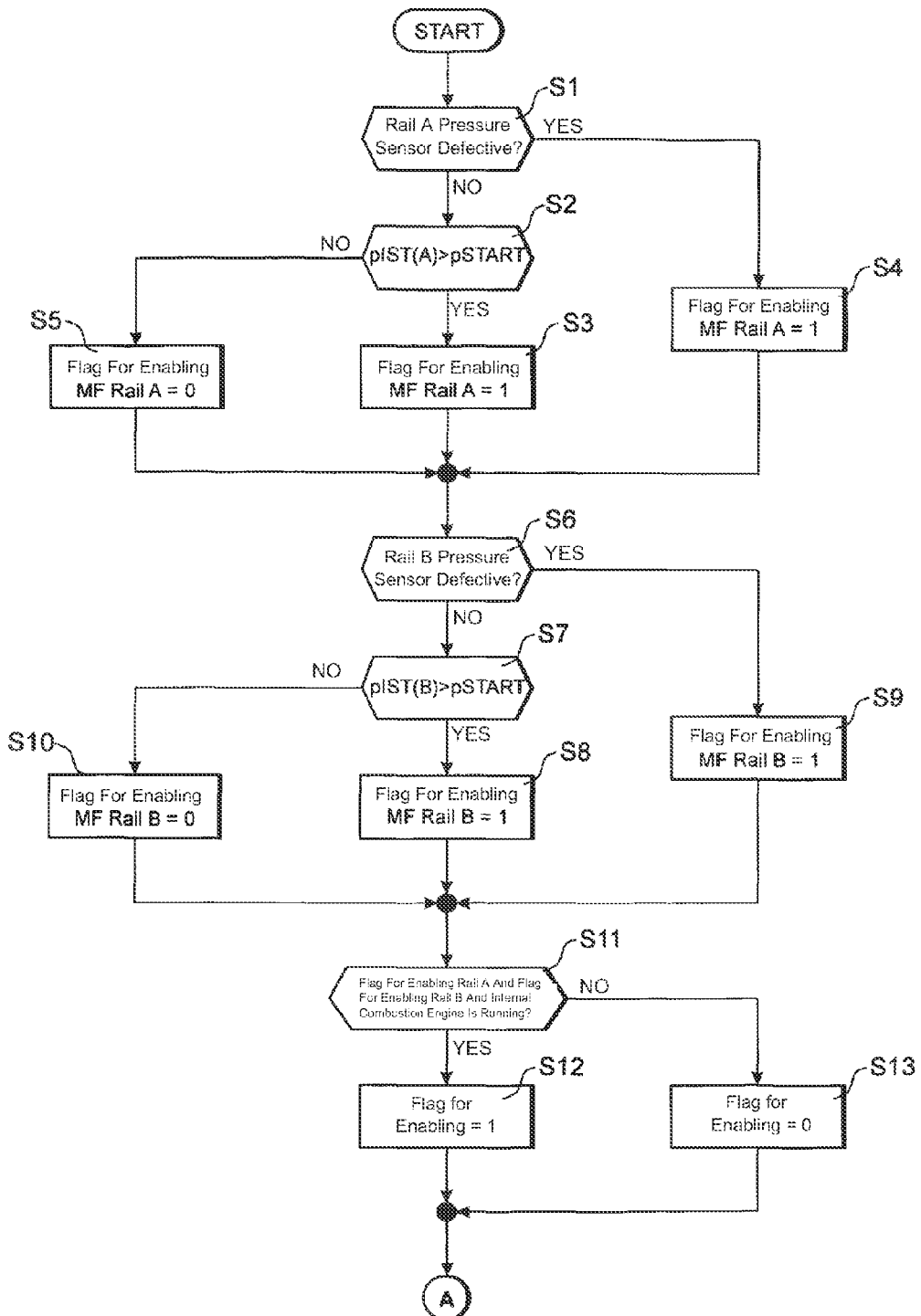
FIG. 6 is a program flowchart.
Figure 6B:
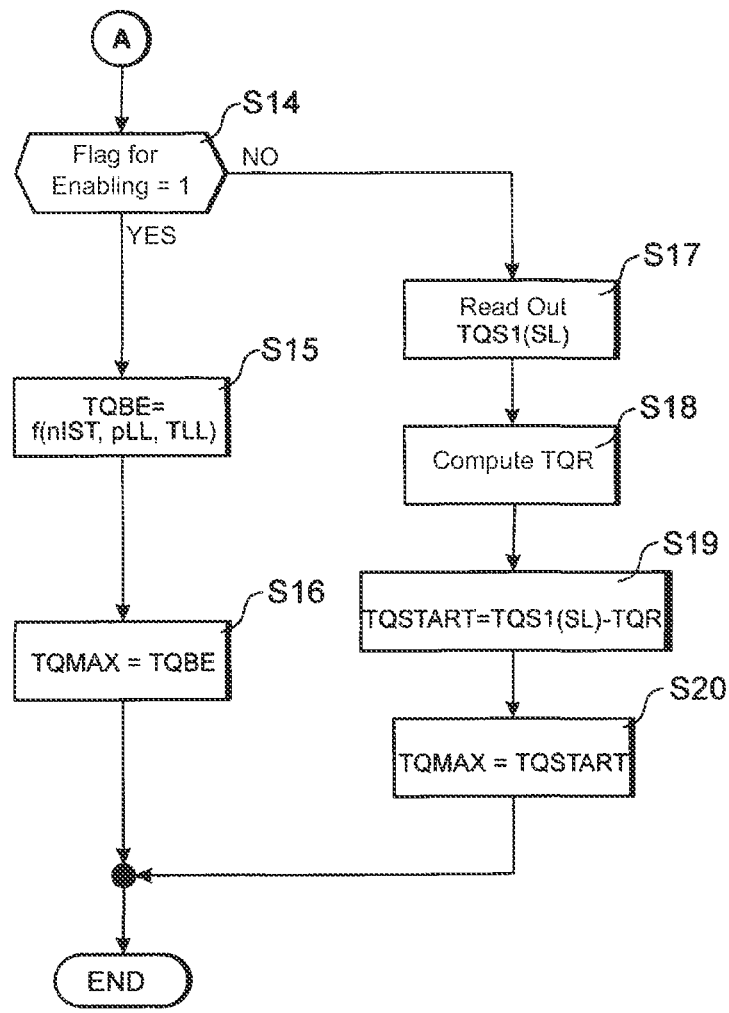

FIG. 6 shows a program flowchart of the method. FIG. 6 comprises the two FIGS. 6A and 6B. At S1 a test is performed to determine whether the A-side rail pressure sensor is defective. If this is the case, then at S4 a flag for the A-side rail is set to 1. If the A-side rail pressure sensor is not defective (interrogation result S1: no), then at S2 I test is performed to determine whether the A-side actual rail pressure pIST(A) exceeds the starting rail pressure pSTART, for example, pSTART=300 bars. If this is not the case (pIST(A)<pSTART), then at S5 the flag for the A-side rail is set to the value 0. Otherwise, at S3 the flag for the A-side rail is set to the value 1. Then at S6 the B-side rail pressure sensor is tested in the same way. If this sensor is defective, then at S9 the flag for the B-side rail is set to the value 1. Otherwise, a check is made at S7 to determine whether the B-side actual rail pressure pIST(B) is greater than the starting rail pressure pSTART. If pIST(B) is still less than the starting rail pressure pSTART (interrogation result S7: no), then at S10 the flag for the B-side rail is set to the value 0. If the B-side actual rail pressure is greater than the starting rail pressure pSTART, then at S8 the flag for the B-side rail is set to the value 1.

At S11 a test is then performed to determine whether the flag for the A-side rail is set to 1, the flag for the B-side rail is set to 1, and a verified engine speed is present. If this is the case, then at S12 a flag for enabling is set to the value 1. If the condition is not satisfied, then at S13 the flag for enabling is set to the value 0. At S14 (see FIG. 6B), the value of the flag is checked. If the flag is not set to 1, then at S17 the first data point of the efficiency input-output map, here: TQS1(SL)=−100 Nm, is read out. Then at S18 the friction torque TQR is computed by a friction torque input-output map, and at S19 the starting torque TQSTART is computed. At S20 the maximum torque TQMAX, which serves as the input variable of the limiter 11 of the set torque, is set to the starting torque TQSTART. If it was determined at S14 that the flag has the value 1, then at S15 the operating torque TQBE is computed as a function of the actual speed nIST, the charge air pressure pLL, and the charge air temperature TLL. Then at S16 the maximum torque TQMAX is set to the operating torque TQBE. The program flowchart then ends.

LIST OF REFERENCE NUMBERS 1 internal combustion engine
2 fuel tank
3A, B low-pressure pump
4A, B suction throttle
5A, B high-pressure pump
6A, B rail
7A, B injector
8A, B rail pressure sensor
9 electronic engine control unit (ECU)
10 speed controller
11 limiter
12 efficiency input-output map (WKF)
13 computing unit
14 injector input-output map
15 controlled system
16 filter
17 computing unit
18 comparator
19 comparator
20 AND gate
21 AND gate
22 OR gate
23 OR gate
24 AND gate

The invention claimed is:

1. A method for open-loop and closed-loop control of a V-type internal combustion engine with an independent A-side common rail system having only one A-side common rail and A-side injectors in fluid communication with the only one A-side common rail and an independent B-side common rail system having only one B-side common rail and B-side injectors in fluid communication with the only one B-side common rail, the A-side injectors being separate from the B-side injectors, the method comprising the steps of: automatically controlling speed of the internal combustion engine in a closed-loop speed control system; and limiting a set torque, as a correcting variable of a speed controller, during a start-up process to a starting torque to produce a zero set injection quantity so that injection to both sides remains blocked as long as the A-side actual pressure and the B-side actual rail pressure are less than a starting rail pressure, the method further including enabling a positive set injection quantity when a verified engine speed is present, both an A-side rail pressure sensor and a B-side rail pressure sensor are operating correctly, and both the A-side actual rail pressure and the B-side actual rail pressure exceed the starting rail pressure.

2. The method in accordance with claim 1, including enabling the positive set injection quantity by limiting the set torque to an operating torque as a maximum torque, which is computed at least as a function of actual speed.

3. The method in accordance with claim 2, including enabling the positive set injection quantity if a verified engine speed is present and the B-side actual rail pressure exceeds the starting rail pressure when the A-side rail pressure sensor is defective and the B-side rail pressure sensor is operating correctly.

4. The method in accordance with claim 2, including enabling the positive set injection quantity if a verified engine speed is present and the A-side actual rail pressure exceeds the starting rail pressure when the B-side rail pressure sensor is defective and the A-side rail pressure sensor is operating correctly.

5. The method in accordance with claim 2, including enabling the positive set injection quantity if, in case of a defective A-side rail pressure sensor and a defective B-side rail pressure sensor, a verified engine speed is present.

6. The method in accordance with claim 1, including computing the set injection quantity by an efficiency input-output map as a function of the limited set torque and actual speed.

7. The method in accordance with claim 6, including providing the efficiency input-output map in such a form that for a first data point of the set torque, a set injection quantity of zero, the zero set injection quantity, is computed, independently of the actual speed.

8. The method in accordance with claim 7, including setting a set total torque, which is computed as a sum of the set torque and friction torque, is set as the input variable of the efficiency input-output map instead of the limited set torque.

9. The method in accordance with claim 1, including computing energization time for actuating injectors by an injector input-output map at least as a function of the set injection quantity.

* * * * *